Jan. 27, 1925.
H. W. PARTLOW
1,524,452
HEAT CONTROL FOR HOT WATER STORAGE TANKS
Filed June 14, 1924 2 Sheets-Sheet 1
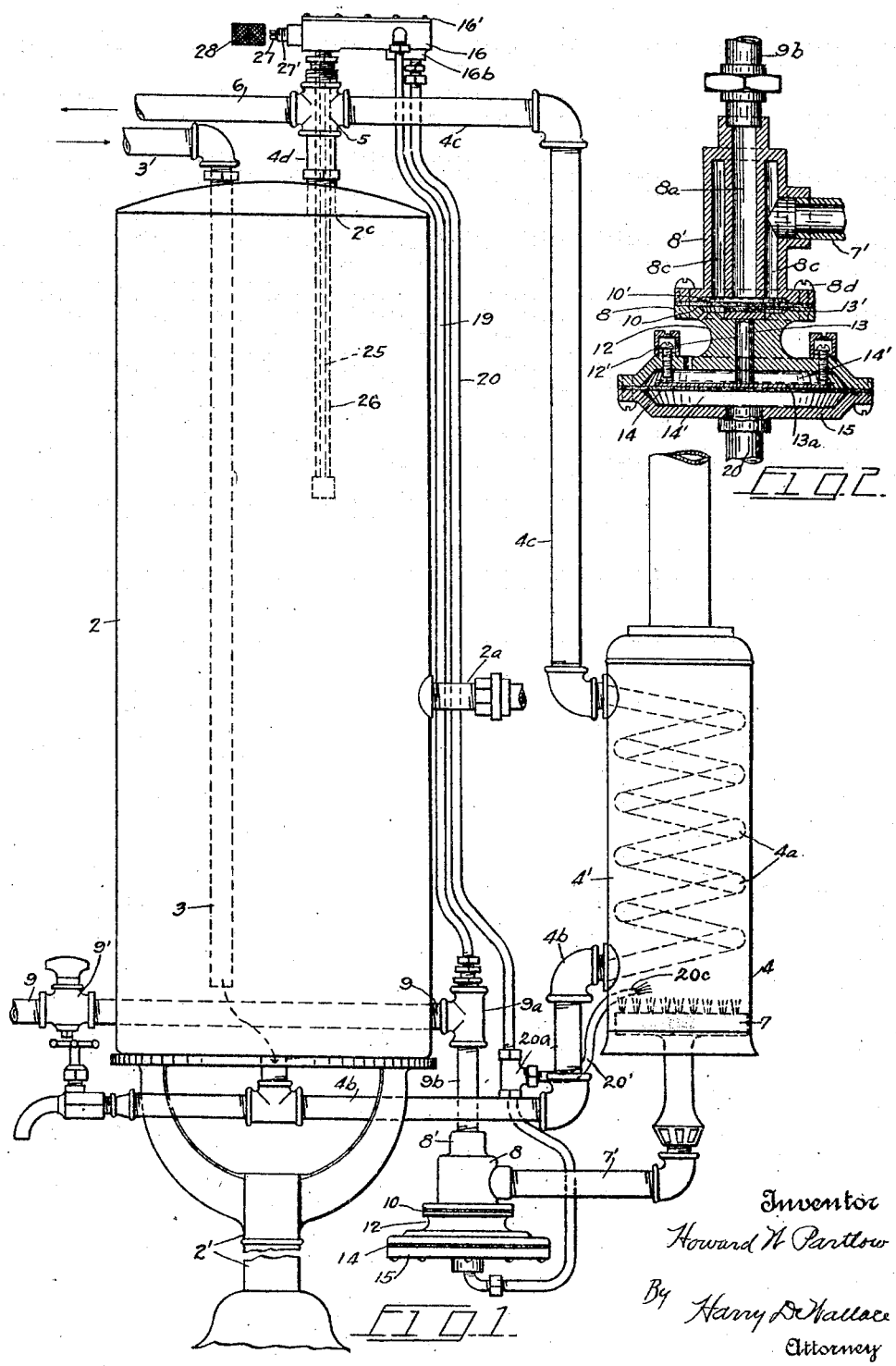

Jan. 27, 1925.  
H. W. PARTLOW  
1,524,452  
HEAT CONTROL FOR HOT WATER STORAGE TANKS  
Filed June 14, 1924    2 Sheets-Sheet 2
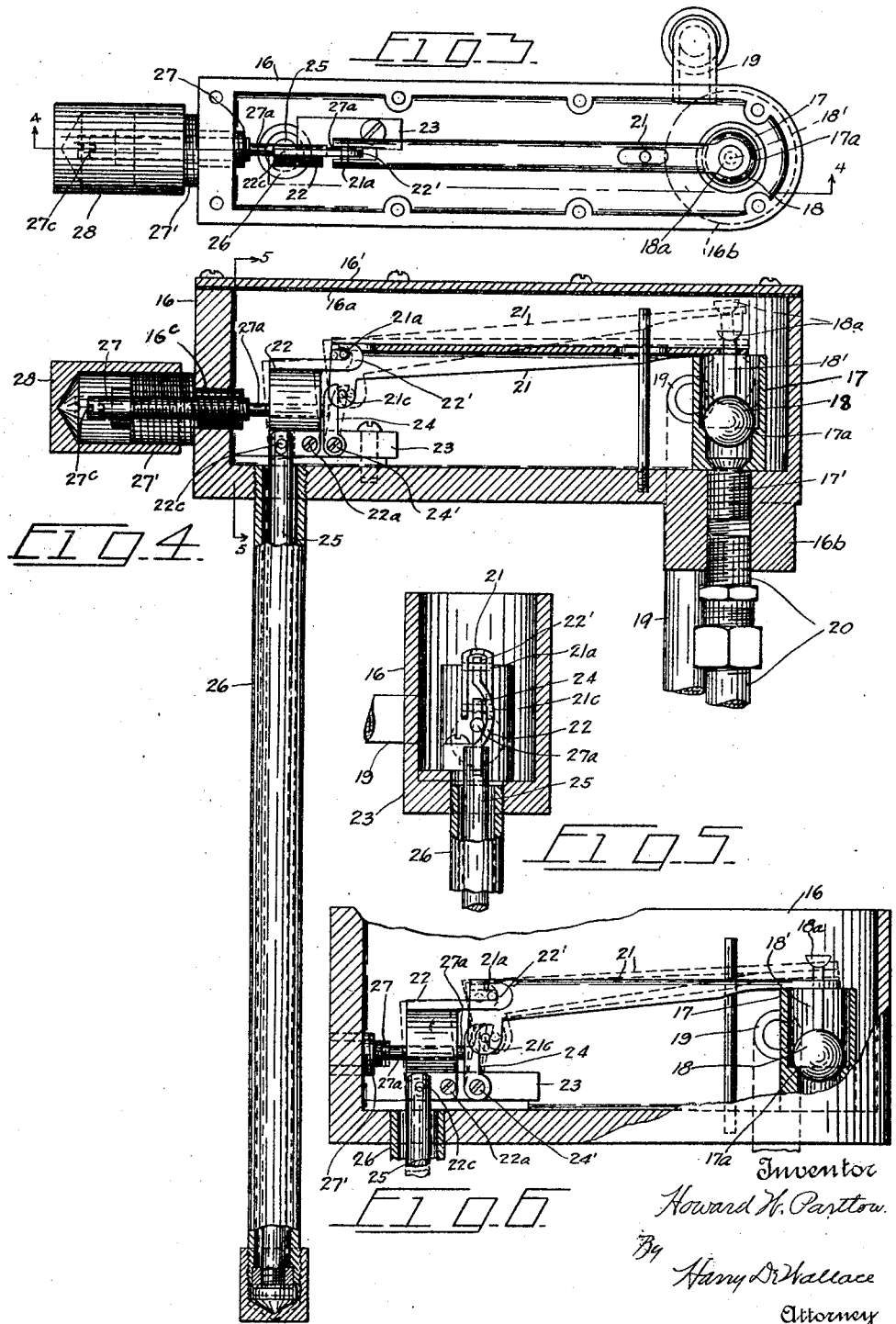

Patented Jan. 27, 1925.

1,524,452

UNITED STATES PATENT OFFICE.

HOWARD W. PARTLOW, OF UTICA, NEW YORK.

HEAT CONTROL FOR HOT-WATER STORAGE TANKS.

Application filed June 14, 1924. Serial No. 720,117.

*To all whom it may concern:*

Be it known that I, HOWARD W. PARTLOW, a citizen of the United States, residing at Utica, in the county of Oneida and State of New York, have invented certain new and useful Improvements in Heat Controls for Hot-Water Storage Tanks, of which the following is a specification.

This invention relates to means for automatically controlling the gas-burners, by which the water for any hot-water storage system may be heated, and has for its object to provide a novel, simple and highly sensitive thermostatic governor, which may be directly applied to a hot-water storage tank, and which is arranged to mechanically and thermostatically control a relatively wide range of heating, through the medium of fluid pressure, which the governor dispenses. A further object is to provide a diaphragm type of valve, which is operated automatically and intermittently, as the temperature of the storage tank fluctuates, by the fluid pressure dispensed by the governor, and which directly controls the supply of the fuel-gas to the burner of the water heater. A further object is to equip the governor with novel mechanism, by which the valve that dispenses the fluid pressure may be adjusted for predetermining minimum and maximum temperatures at which the water in the storage tank may be established and maintained. And a further object is to provide novel means for maintaining a pilot-light, for preventing the extinguishment of the burners in the interim between the intermittent heating periods.

I attain these objects by the means set forth in the detailed description which follows, and as illustrated by the accompanying drawings, in which—

Figure 1 is an elevational diagram of a hot-water storage tank and water heater, to which my improvement is applied. Fig. 2 is a central vertical section through the diaphragm valve. Fig. 3 is a top-plan view of the governor with the cover removed. Fig. 4 is a vertical longitudinal section, taken on line 4—4 of Fig. 3. Fig. 5 is a vertical cross-section, taken on line 5—5 of Fig. 4. And Fig. 6 is a view similar to Fig. 4; showing the manner of effecting certain adjustments preliminary to the thermostatic operation of the fluid pressure governing valve.

In the drawings, 2 represents an ordinary hot-water storage tank, which is mounted upon a pedestal 2'. 3 represents the cold-water feed pipe, which usually enters the top, and discharges the fresh water near the bottom of the tank 2. 2ª represents a pipe which taps the medial portion of the tank, and may be used for connecting the tank with a water-heating coil of either a furnace, a cook-stove, or a common heating stove. 4 represents the usual gas-burning water heater, such as is commonly used in connection with storage tanks of the type shown, and consists mainly of a casing 4', in which is disposed a spirally-formed water pipe 4ª, which receives the cool water from the bottom of the tank 2 by means of a pipe 4ᵇ; the hot-water being conducted from the coil 4ª back to the boiler 2, by a pipe 4ᶜ, which discharges the products of the heater 4 into the top of the tank, as at 2ᶜ. The pipe 4ᶜ is fitted with a cross 5, which facilitates the joining of the pipe 4ᶜ, a pipe 4ᵈ, and a pipe 6, by which the hot-water may be conducted to bath-rooms, sinks or lavatories, located in different parts of a building. The coil 4ª is heated by a burner 7, which receives the fuel-gas through a pipe 7', from a diaphragm valve 8. The gas for the heating, and for the governing and controlling of the valve 8, is preferably supplied by a main 9, which is fitted with the usual cock 9'. The pipe 9 discharges the gas into a T 9ª, from which a pipe 9ᵇ carries the gas to the fuel compartments of the valve 8. The valve 8 comprises an upright cylindrical body 8', having a central passage 8ª that receives the fuel gas from the pipe 9ᵇ. The passage 8ª is disposed axially in an inner cylindrical portion, the latter depending in a concentric chamber 8ᶜ, which communicates with the pipe 7'. The lower end of the passage 8ª is normally open for the discharge of the fuel gas into the chamber 8ᶜ. The feed of the gas to the burner 7 is controlled directly by a diaphragm 10, which is disposed in and divides a chamber 10', the latter being formed by the hollow meeting faces of the body 8' and a part 12, the latter parts being rigidly connected by bolts 8ᵈ. The diaphragm 10 is normally positioned below and clear of the open bottom end of the conduit 8ᵃ during the firing of the burner 7, the fuel supply to the said burner being shut off by the raising of the diaphragm, which is effected directly by a plunger 13. The plunger 13 is movable vertically in a central opening 12' of the body 12, and its top end is fitted with a disc 13', preferably felt or like cushion material, which normally contacts with the bottom side of the diaphragm 10. The disc 13' is preferably larger than the diameter of the passage 8ᵃ, and when it raises the diaphragm, the latter effects the positive closing and sealing of the said passage, and stops the flow of the gas from said passage into chamber 8ᶜ and to the burner 7. The bottom end of the plunger 13 is rigid to a plate 13ᵃ, which is mounted upon a larger diaphragm 14, the latter being disposed in a shallow circular chamber 14', which is formed by the recessed bottom face of the body 12, and the corresponding recessed top face of a cap 15. The diaphragm 14 divides the chamber 14' into upper and lower compartments, which are non-communicating. The charging of the lower compartment of chamber 14' with gas or other fluid pressure, flexes the diaphragm 14 upwardly, which effects the like movement of the plunger 13 and the diaphragm 10, for shutting off the fuel-gas to the burner 7, as explained. When the pressure beneath the larger diaphragm is relieved or withdrawn, as when the contents of the boiler 2 cools, the plunger 13 and the several diaphragms gravitate to their normal positions, shown by the full lines in Fig. 2, which allows the gas to flow from the passage 8ᵃ into chamber 8ᶜ, and thence towards the burner for repeating the heating of the water by the coil 4ᵃ. The fluid pressure, for effecting the upward flexing of the diaphragms 10—14, is supplied to the valve 8 intermittently, as the temperature of the tank 2 fluctuates between predetermined degrees, by a thermostatically actuated governor, which will now be described;

16 represents the elongated hollow body of the governor, having a normally open top, which is closed and sealed by a cap 16' and a packing 16ᵃ, for making the body gas-tight. At one end the body is provided with a depending portion 16ᵇ, which is bored axially and threaded to receive the reduced threaded portion 17' of a tubular valve body 17, whose mid-interior is formed with a circular ledge or seat 17ᵃ, for a spherical valve 18. The body 16 is arranged to be constantly charged with fluid pressure (gas), for controlling the valve 8, by means of a pipe 19, which receives the pressure from the T 9ᵃ. This fluid pressure is intermittently dispensed by the valve 18, whenever the latter is unseated, and is conducted from the governor to the bottom compartment of the chamber 14', by a pipe 20. The spherical valve 18 is provided with a stem 18', which passes loosely through one end of a lever 21, for permitting the valve to be seated by gravity, whether or not said lever is lowered to its fullest extent, as shown by the full lines in Fig. 4, and by the full and dotted lines in Fig. 6. When the tension by which the lever 21 is lifted is fully relaxed, its forward end gravitates to and normally rests upon the top of the body 17'. The top end of stem 18' is formed with a knob 18ᵃ, which is engaged by the lever 21 for lifting the valve away from its seat. The rear-end portion of lever 21 has its lateral edges bent parallel to each other, and said edges are pierced by transverse pins 21ᵃ—21ᶜ. This end of the lever is directly supported by a hook-arm 22' of a rockable dog or part 22, which engages the uppermost pin 21ᵃ, the latter being disposed in the bight of the said hook. The lower right corner of the dog 22 is pivoted to a block 23, by a screw 22ᵃ, which permits the dog to be rocked in a vertical plane for effecting the raising and lowering of the forward end of lever 21, as shown in Figs. 4 and 6. 24 represents a second dog, which is also pivoted to the block 23, by a screw 24'. This dog normally stands upright in line vertically with the hook 22' and is in normal engagement with the pin 21ᶜ of the lever. When the dog 24 is held tightly against the pin 21ᶜ, the said pin serves as the fulcrum or axis around which the lever 21 is tilted. The lower left corner of the dog 22 is pivoted by a pin 22ᶜ to the top end of a solid thermostatic member 25, which extends downwardly through an opening in the casing, and is loosely inclosed in a tubular thermostatic member 26. By this construction and arrangement of the parts, the contraction and expansion of the thermostat 25—26, rocks the dog 22 on its eccentric pivot 22ᵃ and effects the tilting of lever 21 correspondingly, for opening, as well as for allowing the gravitative closing of the valve 18. The dog 24, in order to effectively co-operate with the dog 22, for tilting the lever 21, must be constantly held in firm engagement with the pin 21ᶜ. To this end, I provide a screw 27, which is adjustably supported by an internally threaded bushing 27', the latter being screwed into an opening 16ᶜ of the casing. The portion 27ᵃ of the screw 27 which projects into the casing is reduced and plain, and its free end abuts the rear edge of the dog 24, between its pivot and the pin 21ᵇ. The outer end of the screw 27 is provided with the usual screw-driver slot 27ᶜ for rotating the screw. 28 represents a hollow threaded cap, which screws on to the outer end of the bushing, for enclosing and protecting the screw 27. The screw 27, in addition to serving as a positive stop for preventing rocking of the dog 24 by the tilting actions of the dog 22 and lever 21, is also employed for adjusting the said lever, for predetermining the temperature of the water in the tank 2, as shown in Fig. 6, wherein the lever 21 appears in several different positions: The full lines showing the forward end of the lever resting on top of the body 17, the valve 18 seated by gravity, and the stem 18' and the knob 18ᵃ extending some distance above the lever. When the parts are in the position last described, the valve 18 is not supported by the lever 21, and the said lever must be raised by the thermostat (or by the screw 27) until it engages the knob 18ᵃ, before the valve can be unseated. If this idle movement of the lever is left for the thermostat to effect, the latter must expand to a considerable extent, which means that the temperature of the tank 2 will continue to rise until the opening of the valve 18 is finally effected. It will thus be understood that by the present construction and arrangement, my governor is adapted for controlling a relatively wide range of heating, and temperature may be predetermined and accurately attained by the preliminary adjustment of the screw 27, supplemented by the thermally actuated parts 25—26.

In order to control the supply of the fuel-gas to the burner 7, when comparatively low temperatures are required, as for example, for heating water for storage purposes, as herein shown, and wherein the expansive and contractive range of the thermostat 25—26, under the circumstances, is naturally very slight, the adjusting screw 27 should first be operated in the direction for reducing the initial movement of the lever 21 towards the knob 18ᵃ of the valve stem (see dotted lines Fig. 6), so as to bring the ultimate temperature control within the relatively short range of the thermostat, as explained.

The governor is preferably disposed a short distance above the top of the tank 2, and the thermostat 25—26, which is preferably relatively long, is inserted downwardly through the cross 5 and the pipe 4ᵈ, and preferably projects 30 to 40 inches into the hottest zone of the tank. This mode of applying the governor, obviates the necessity of weakening the top of the tank by increasing the number of openings. By this disposition of the thermostat, the desired temperature of the relatively large body of the water may be established and maintained, and as the hot contents of the tank are drawn off from the portion of the tank where the thermostat is disposed, the slightest lowering of the temperature below the degree predetermined by the adjustment of screw 27, immediately causes the contraction of the members 25—26, which in turn instantly effects the closing of the valve 18, and the consequent gravitative opening of the valve 10, for relighting the burner 7 and restoring the loss of temperature in the tank 2.

To raise the temperature of the tank 2 to a degree higher than normal, as described, the screw 27 may be turned in the direction for relaxing the dog 24 and lever 21, thereby increasing the initial movement of the lever 21 and correspondingly retarding the opening of the valve 18. This delayed opening of the valve 18, allows the burner 7 to operate at full blast for a correspondingly longer period, before the fluid pressure in the governor is released for effecting the closing of the passage 8ᵃ and shutting off the fuel supply.

In order to prevent the extinguishment of the burner 7, between the periodical heatings of the contents of tank 2, I provide a relatively small pipe 20', which connects with the pipe 20 by means of a T 20ᵃ. The pipe 20' extends into the casing 4 of the heater and terminates in a relatively fine nozzle 20ᶜ, that produces a tiny light, which may be maintained by the gas with which the chamber 14' and the pipe 20 are charged, until the next opening of the valve 18. In this manner none of the gas employed for operating the valve 8 is wasted or lost, and the burner 7 may be automatically relighted, as often as required.

My automatic heat control is extremely simple, reliable, and economical. By its use a plentiful supply of water of any desired temperature may be constantly maintained in the tank 2, at a reasonable expense, and neither the governing apparatus, nor the water heating parts need any attention or care, except casual inspection of the water and fuel supplies.

Having thus described my invention, what I claim, is—

1. The combination with a storage tank having cold water and hot water inlets at its top, and a burner for heating the water in the tank, of a heat governor mounted above said tank, a thermostatic element associated with said governor, said element being inserted downwardly through said hot water inlet and thence deeply into the body of water below said inlet adapted to expand and contract corresponding to the rise and fall of the temperature of the water, fluid pressure means for controlling the feed of fuel gas to said burner, a gravitative valve adapted to supply the fluid pressure for shutting-off the fuel gas to the burner when the temperature in the tank rises to a predetermined degree, and means for adjusting said valve for predetermining the range of temperature said thermostat may control.

2. The combination with a hot-water storage tank having cold water and hot-water inlets in its top, and a burner for heating the water in the tank, of a thermostatic element inserted through the hot-water inlet and thence extended downwardly deeply into the body of water of the tank, a governor comprising a hollow body adapted to be charged with fluid pressure disposed above the hot-water inlet and supporting said thermostatic element, a valve in said body, said valve adapted to be opened by said element for dispensing the fluid pressure, a second valve for supplying fuel-gas to said burner, said second valve adapted to be closed by the fluid pressure dispensed by the first valve, for shutting-off the supply of the fuel-gas to the burner when the temperature of the water in said tank reaches a predetermined degree, said second valve adapted to open by gravity when the supply of fluid pressure from the governor is stopped, a mechanism for controlling the movements of the first valve, adapted to be adjusted for gauging the range of the initial opening movements of the valve-operating parts by the thermostatic element before said element finally opens the first valve.

3. In a heat governor for hot-water storage tanks, the combination with a tank having cold-water and hot-water inlets in its top and a gas burner for heating the water in said tank, of a hollow body adapted to be charged with fluid pressure disposed above the hot-water inlet, a thermostatic element associated with said body and extending downwardly through said inlet and thence deeply into the hottest zone of the tank, a valve for dispensing said fluid-pressure disposed in said body adapted to be opened by the expanion of said element, and to close by gravity by the contraction of the element, a second valve adapted for supplying fuel gas to the burner located at a distance from said body, a pipe for conducting the fluid pressure from the body to the second valve for closing said valve when the temperature of the water in said tank reaches a predetermined degree, said second valve adapted to open by gravity when the supply of fluid pressure is shut off, means for adjusting the valve in said body for limiting the opening movement thereof by said element, and means for preventing the extinguishment of said burner during its inactive periods.

4. In a heat governor for hot-water storage systems, the combination with a tank having cold-water and hot-water inlets in its top and a gas-burner for heating the water in the tank, of a hollow body adapted to be charged with fluid pressure disposed above said tank, a thermostatic element depending from the body and passing through the hot-water inlet into the body of heated water in the top portion of the tank, a valve for dispensing the fluid pressure, said valve adapted to be opened by the expansion of said element, said valve adapted to close by gravity for stopping the issuance of the fluid pressure from the body by the contraction of said element, means for adjusting said valve for predetermining the temperature of the water in the tank and for limiting the opening movement of the valve by said element, a valve for supplying fuel-gas to the burner, said fuel valve adapted to be opened by gravity by the closing of the fluid pressure valve and to be closed by the fluid pressure dispensed by the opening of the fluid pressure valve.

5. The combination with a hot-water storage tank having a hot-water inlet in its top and a gas-burning water heater for heating the water in the tank, of a heat governor comprising a hollow body adapted to be constantly charged with fluid pressure, a distant valve adapted to be closed by the fluid pressure for shutting off the gas to the burner, said valve adapted to open by gravity when the fluid pressure is withdrawn, a valve in said body for dispensing the fluid pressure for closing the distant valve, a lever for opening the body valve, a dog in contact with a part of said lever adapted with said lever to provide the fulcrum or axis around which the lever revolves during the opening and closing of the body valve, a screw for holding said dog and said part against accidental movement, and a thermostat depending from the body, said thermostat passing through the hot-water inlet and sinking deeply into the water near the top of the tank, adapted to expand as the temperature of the water in the tank rises and to effect the tilting of said lever for opening the body valve, for effecting the closing of the distant valve and stopping the greater heating of the water in said tank.

6. The combination with a storage tank, a water heater comprising a gas-burner, and a valve for supplying fuel gas to said burner, said valve adapted to be controlled by fluid pressure, of a thermostat inserted downwardly in the top of the tank, a hollow body supported by said thermostat above the tank, said body adapted to be charged with fluid pressure, a valve in said body for controlling the out-flow of the fluid pressure towards the fuel supply valve, a pipe for conducting the fluid pressure from the body to the fuel valve, a lever for controlling the body valve, a dog interposed between said thermostat and said lever, whereby the expansion of the thermostat effects the opening of the body valve, said body valve adapted to close by gravity whenever said thermostat contracts by the cooling of the water in the tank, a second dog in said body in constant engagement with a part of said lever, and constituting with said part the fulcrum around which said lever rotates during the opening and closing of the body valve, and means abutting said second dog for predetermining the opening movements of the body valve and for controlling the operative range of the thermostat.

In testimony whereof I affix my signature.

HOWARD W. PARTLOW.